(12) United States Patent
Bavendiek et al.

(10) Patent No.: US 6,467,581 B2
(45) Date of Patent: Oct. 22, 2002

(54) OPERATOR'S CAB FOR MOBILE MACHINES

(75) Inventors: Rainer Bavendiek, Wentorf; Dirk Scharr, Hamburg; Joachim Todter, Bargteheide, all of (DE)

(73) Assignee: Still GmbH (DE)

( * ) Notice: Subject to any disclaimer, the term of this patent is extended or adjusted under 35 U.S.C. 154(b) by 0 days.

(21) Appl. No.: 09/809,131

(22) Filed: Mar. 15, 2001

(65) Prior Publication Data

US 2001/0022251 A1 Sep. 20, 2001

(30) Foreign Application Priority Data

Mar. 17, 2000 (DE) .......................................... 100 13 070

(51) Int. Cl.[7] ................................................. B66F 9/075
(52) U.S. Cl. ...................... 187/222; 180/89.12; 296/190
(58) Field of Search ....................... 187/222; 180/89.12; 296/190

(56) References Cited

U.S. PATENT DOCUMENTS

| | | | | |
|---|---|---|---|---|
| 3,788,627 A | * | 1/1974 | Wieland | .................... 267/64 R |
| 4,235,470 A | * | 11/1980 | Kauss et al. | ......... 180/89.12 X |
| 4,469,315 A | * | 9/1984 | Nicholls et al. | ......... 267/64.17 |
| 5,725,066 A | * | 3/1998 | Beard et al. | ............. 180/89.12 |
| 5,727,440 A | * | 3/1998 | Katz et al. | ..................... 91/4 R |
| 5,779,009 A | | 7/1998 | Iwasaki | ....................... 188/299 |
| 5,899,288 A | * | 5/1999 | Schubert et al. | ......... 180/89.12 |

FOREIGN PATENT DOCUMENTS

| | | |
|---|---|---|
| DE | 92 00 428.8 | 4/1992 |
| DE | 43 13 973 | 11/1994 |
| DE | 197 03 242 | 7/1997 |
| JP | 6127296 | * 5/1994 |
| WO | WO 91/04221 | 4/1991 |

* cited by examiner

*Primary Examiner*—Steven A. Bratlie
(74) *Attorney, Agent, or Firm*—Webb Ziesenheim Logsdon Orkin & Hanson, P.C.

(57) ABSTRACT

A mobile machine, in particular a fork lift truck, having a chassis and a cab located on the chassis. There are one or more pneumatic or hydropneumatic suspension elements to improve comfort and ride quality between the chassis and the cab.

6 Claims, 2 Drawing Sheets

OPERATOR'S CAB FOR MOBILE MACHINES

BACKGROUND OF THE INVENTION

1. Field of the Invention

This invention relates to a mobile machine, in particular an industrial truck or a fork lift truck, having a chassis and an operator's cab located on it by a suspension system.

2. Description of the Prior Art

Operators of mobile machines are frequently subjected to significant vibration stresses because the machines are not equipped with a suspension system. Fork lift trucks in particular normally have no suspension elements between the frame and the chassis. When the mobile machine travels over bumps or depressions, whole-body vibrations can be transmitted to the driver. These vibrations are then damped only by the driver's seat. In machines of the prior art, the operator's cab is mounted on steel-rubber bearings, which of course reduces the vibration load to some extent, but still lets through significantly more vibrations for the driver than are desirable.

Cabs mounted on suspension systems have recently become common on utility vehicles and agricultural tractors.

The journal "Noise & Vibration Worldwide," November 1997, pages 17 to 26, contains a scientific article on the development of suspended cabs for fork lift trucks. In the right-hand column on page 22, the above referenced article proposes replacing the four steel-rubber bearings that normally connect the cab with the chassis with four metal springs and shock absorbing elements. One embodiment of this suspension system is illustrated in FIG. 5 on page 24. The suspension system proposed in the above-referenced article significantly damps the vibrations that are transmitted to the driver's cab, although an even more effective damping of impact loads would be desirable.

The object of the invention is therefore a mobile machine in which the impact load on the operator's cab is reduced even further.

SUMMARY OF THE INVENTION

The invention teaches a mobile machine having a chassis and an operator's cab located on it, in which there are one or more pneumatic or hydropneumatic suspension elements between the chassis and the operator's cab.

The use of a pneumatic or hydropneumatic suspension system significantly reduces the vibration load exerted on the operator. The driver's comfort, while operating the machine, is increased significantly. The expected result is a decrease in injuries to the driver's spinal column. There is also reason to expect an increase in productivity as a result of the greater feeling of well being on the part of the operator.

In one embodiment of the invention, the operator's workplace, or the driver's cab, is guided in the vertical direction by guide elements and is supported on one, two or more cylinders filled with one or two fluids. The guide elements used can be either conventional linear guides such as slides, roller guides, circulating ball guides, and dovetail guides or lifting platform guides. If the travel of the cab is not particularly long, guides consisting of leaf springs or movable arms, for example of the type used on sliding lattice grates, can also be used. Guides on levers or connecting rods can also be used, of the type widely used in the design of suspended chassis of motor vehicles. The fluid is initially pressurized by an adjustable-pressure reservoir unit. The initial pressure can be set to the desired level and thereby adjusted to the weight of the driver. The use of a hydropneumatic suspension system also makes it possible to adjust the height of the cab, and is recommended in particular for use on fork lift trucks, because on these vehicles there is generally already a hydraulic pump that provides sufficient hydraulic pressure.

In one embodiment of the invention, there is an adjustable throttle in the fluid line between the cylinder and the reservoir element, in which case the system consisting of the cylinder, reservoir and throttle represents a spring-mass-damper system, in which the stiffness of the spring can be adjusted by the initial pressure in the reservoir unit, and the damping can be modified by adjusting the cross section of the throttle. This spring-mass-damper system can be adapted to the different cab models or to different driver weights by modifying the initial pressure and the cross section of the throttle. The operator's cab can then be moved up and down by several centimeters, for example, and is effectively suspended by the system described above.

In an additional embodiment of the invention, there can be an active regulation of the suspension system. A system of sensors in the machine can record the operating conditions, and a closed-loop control system continuously sets and adjusts the optimal parameters for the suspension system (initial pressure in the reservoir and throttle cross section). This system further increases the quality of the ride in the vehicle during travel and operation.

BRIEF DESCRIPTION OF THE DRAWINGS

Additional advantages and features of the invention are described in greater detail hereinafter, with reference to the exemplary embodiment of the invention which is illustrated in the accompanying three drawings wherein.

DETAILED DESCRIPTION OF THE PREFERRED EMBODIMENTS

Figure 1:
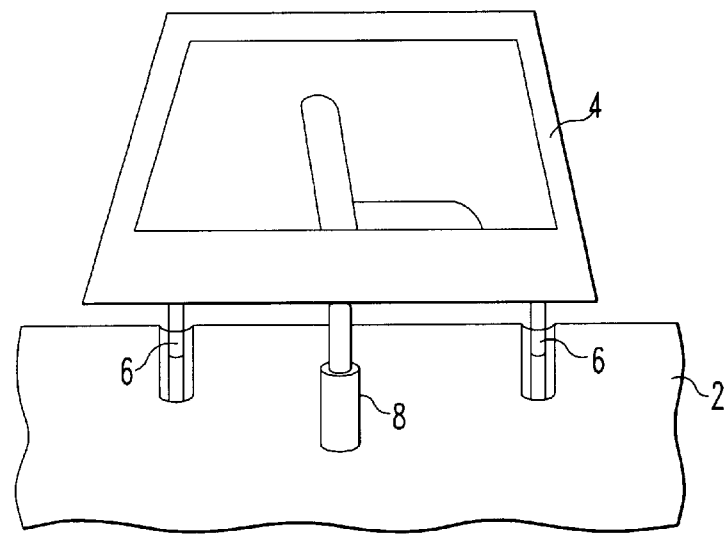
FIG. 1 is a schematic view of a portion of the chassis of a fork lift truck showing the operator's station and its suspension system according to the present invention.

FIG. 1 is a schematic illustration of a portion of a chassis 2 of a fork lift truck with an operator's cab 4 which contains the driver's seat. An operator's cab 4 of this type is generally in the form of a driver's cab, to protect the driver from falling loads or in the event the vehicle tips over. In this exemplary embodiment, the operator's cab 4 is mounted by guide elements 6 so that its height can be adjusted in relation to the chassis 2. The weight of the operator's cab 4 is supported by a pneumatic or hydropneumatic spring element 8, which in this case is located centrally in relation to the operator's cab 4. This pneumatic or hydropneumatic spring element 8, therefore, makes it possible to damp vibrations that would otherwise be transmitted undamped to the operator's cab 4 from the frame of the chassis 2.

Figure 2:
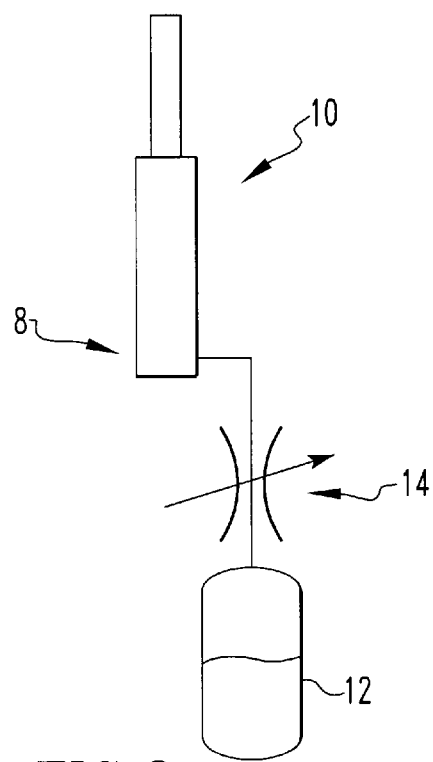
FIG. 2 is a schematic view of a hydropneumatic system as shown in FIG. 1.

FIG. 2 is a more detailed illustration of the spring element 8 of a hydropneumatic suspension system. In this case, the spring element 8 consists essentially of the cylinder 10, the piston of which supports the operator's cab 4, a reservoir unit 12 with an adjustable initial pressure and a fluid line between the cylinder 10 and the reservoir element 12. An adjustable throttle element 14 is provided in this fluid line. Inside the reservoir element 12 there is an elastic membrane, e.g. a rubber membrane, which separates an incompressible fluid such as oil, for example, from a compressible fluid such as air. In this case, the compressible fluid is in the lower half of the reservoir element 12. The incompressible fluid fills the other half of the reservoir element 12, the fluid line and part of the cylinder 10. Impact loads that result from travel over bumps and depressions and are exerted on the chassis 2 are elastically absorbed by the cushion of air in the reservoir element 12. The piston of the cylinder 10 transmits the impact to the operator's cab 4 only in a greatly damped form.

Figure 3:
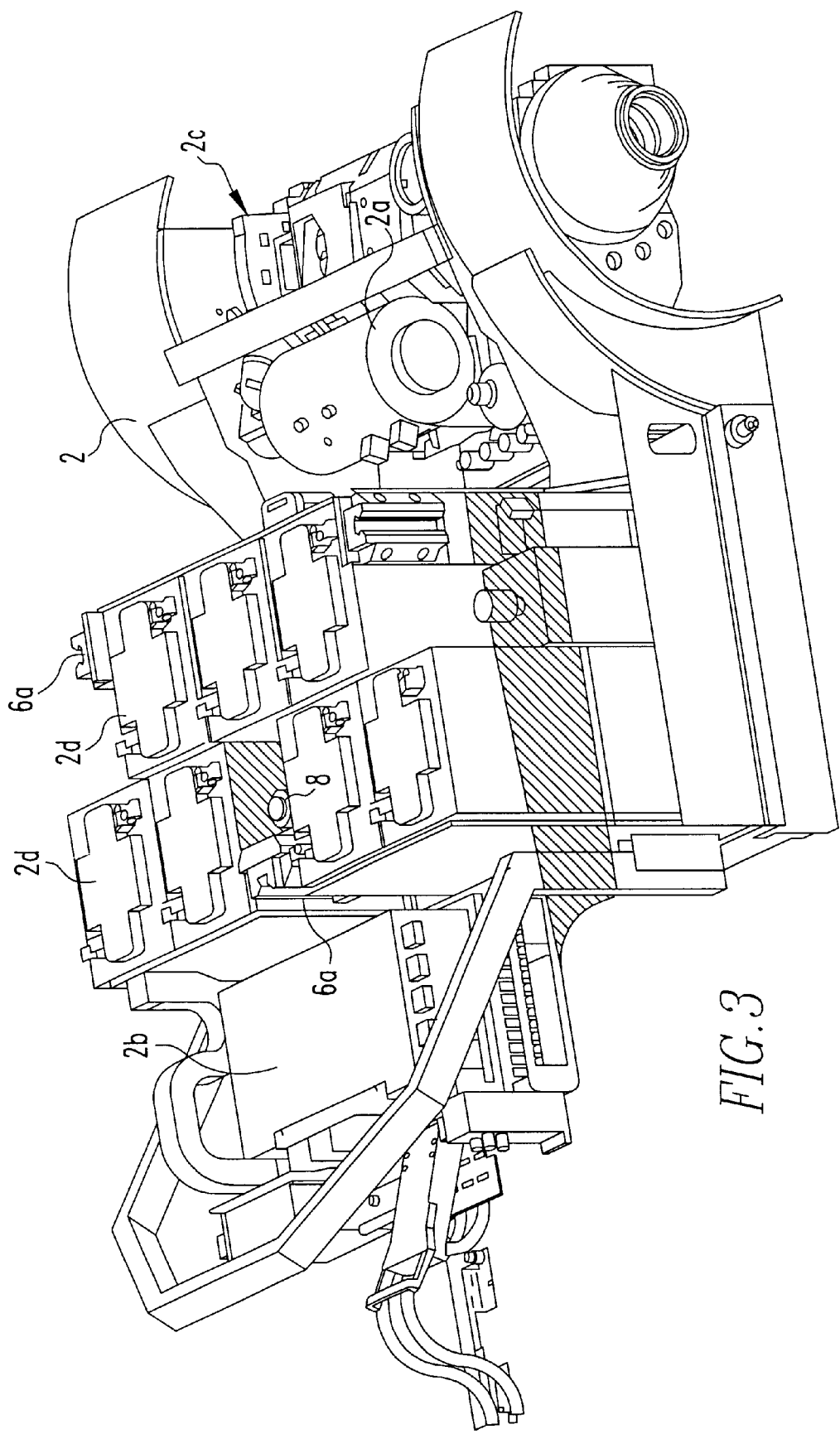
FIG. 3 is a partial view of the chassis of a fork lift truck including the suspension system according to the invention.

FIG. 3 shows a chassis 2 of a fork lift truck that is equipped with the suspension system according to the invention. In this case, the chassis 2 contains an electric motor 2a, an electronic control system 2b, fastening elements 2c for the lifting platform and a plurality of batteries 2d. The invention teaches that there are guide slides 6a, in this case on each on the left and right sides in the vicinity of the front wheels and a third in the rear center. Engaged with these guide slide elements are the guide rods that are located on the operator's cab 4 and project downward. When the operator's cab 4 is occupied, the height of the cab can be adjusted vertically with respect to the chassis 2. The spring element 8 is provided to support the load of the cab or of the operator's cab 4. In this case, the spring element 8 is located directly next to the guide element 6a and is shown pushed all the way down. When there is an initial pressure provided by the hydraulic fluid, the cylinder in the spring element 8 moves up and thus supports the weight of the occupied operator's cab 4.

Having described presently preferred embodiments of the invention, it is to be understood that it may be otherwise embodied within the scope of the appended claims.

We claim:

1. A mobile machine, comprising:

a chassis;

an operator's cab located on the chassis;

at least one hydropneumatic spring element located between the operator's cab and the chassis;

guide elements to allow an upward and downward movement of the operator's cab;

one or more cylinders supporting the operator's cab, upstream of which one or more cylinders is located a reservoir element that has an adjustable initial pressure; and an adjustable throttle in a fluid line between the one or more cylinders and the reservoir element.

2. A mobile machine as claimed in claim 1, wherein said mobile machine is characterized by an active regulation of the suspension and/or damping characteristics.

3. A mobile machine as claimed in claim 1, wherein said mobile machine is a fork lift truck.

4. A fork lift truck comprising:

a lifting platform;

a chassis supporting the lifting platform, the chassis having a plurality of guide slides;

a plurality of batteries supported on the chassis;

an operator's cab supported above the batteries on the chassis, the cab having a plurality of rods engaging the plurality of guide slides; and a hydraulic suspension system mounted on the chassis and supporting the operator's cab, the hydraulic suspension system including at least one hydraulic cylinder supporting the operator's cab, a hydraulic fluid reservoir coupled to the at least one hydraulic cylinder, and an adjustable throttle between the reservoir and the at least one hydraulic cylinder.

5. The fork lift truck as claimed in claim 4, further including an elastic membrane in the reservoir dividing the interior of the reservoir.

6. The fork lift truck as claimed in claim 5, wherein air is contained in one portion of the reservoir and hydraulic fluid is contained in the other portion of the reservoir with the portions separated by the elastic membrane.

* * * * *

UNITED STATES PATENT AND TRADEMARK OFFICE
CERTIFICATE OF CORRECTION

PATENT NO.    : 6,467,581 B2
DATED         : October 22, 2002
INVENTOR(S)   : Rainer Bavendiek et al.

It is certified that error appears in the above-identified patent and that said Letters Patent is hereby corrected as shown below:

<u>Title page,</u>
Item [73], Assignee, "Still GmbH" should read -- STILL GmbH --
Item [56], References Cited, insert:
-- OTHER PUBLICATIONS
"Development of a Low Frequency Suspension Cab for Fork Lift Truck",
*Noise & Vibration Worldwide*, Nov. 1997 (pp. 17-26) --.

Signed and Sealed this

Twentieth Day of May, 2003

JAMES E. ROGAN
*Director of the United States Patent and Trademark Office*